United States Patent [19]

Houston, Jr. et al.

[11] E Patent Number: Re. 32,870

[45] Reissued Date of Patent: Feb. 21, 1989

[54] SEWER RELIEF VALVE

[76] Inventors: James M. Houston, Jr., 651 Brighton Dr., Lawrenceville, Ga. 30245; John W. Baker, 6851 Roswell Rd. NE. G-20, Atlanta, Ga. 30328

[21] Appl. No.: 916,990

[22] Filed: Oct. 9, 1986

Related U.S. Patent Documents

Reissue of:

[64] Patent No.: 4,475,571
Issued: Oct. 9, 1984
Appl. No.: 502,187
Filed: Jun. 7, 1983

[51] Int. Cl.[4] ..... F16K 31/18; F16K 33/00

[52] U.S. Cl. ..... 137/430; 4/211; 137/315; 137/357; 137/445; 137/448; 137/559; 137/584; 220/254; 220/326; 220/366; 251/89; 251/147; 251/299

[58] Field of Search ..... 137/429, 430, 434, 445, 137/448, 559, 584, 356, 357, 315; 4/211, 255, 287, 295; 220/254, 307, 311, 316, 326, 366; 251/104, 147, 89, 299

[56] References Cited

U.S. PATENT DOCUMENTS

| | | | |
|---|---|---|---|
| 847,081 | 3/1907 | Kern | 137/448 |
| 1,113,648 | 10/1914 | Karlson | 137/448 |
| 1,183,692 | 5/1916 | Strout | 137/448 |
| 1,278,968 | 9/1918 | Maki | 137/445 |
| 1,286,603 | 12/1918 | Hahn | 220/254 |
| 1,462,253 | 7/1923 | Tobiasson | 137/448 |
| 1,511,610 | 10/1924 | Holmes | 137/559 |
| 1,671,025 | 5/1928 | Franzmeier | 220/366 |
| 2,292,509 | 8/1942 | Carson | 251/147 |
| 2,786,542 | 3/1957 | Orfei et al. | 137/356 |
| 2,835,269 | 5/1958 | Seymour | 251/104 |
| 2,896,904 | 7/1959 | Northup | 251/147 |
| 2,936,775 | 5/1960 | Hinkson et al. | 137/381 |
| 2,990,845 | 7/1961 | Sklash et al. | 137/358 |
| 3,334,649 | 8/1967 | Thompson | 137/448 |
| 3,439,831 | 4/1969 | Pullen | 220/366 |
| 3,603,340 | 9/1971 | Rousselet | 137/357 |
| 4,114,641 | 9/1978 | Robinson et al. | 137/448 |
| 4,215,724 | 8/1980 | Logsdon | 137/852 |
| 4,217,930 | 8/1980 | Lerner et al. | 220/366 |
| 4,261,386 | 4/1981 | Young | 137/356 |

FOREIGN PATENT DOCUMENTS

| | | | |
|---|---|---|---|
| 509576 | 2/1928 | Fed. Rep. of Germany | 220/326 |

*Primary Examiner*—George L. Walton
*Attorney, Agent, or Firm*—Jones, Askew & Lunsford

[57] ABSTRACT

An improved sewer relief valve which is vandal-proof and automatically opens responsive to a back flow of sewage and drain water within a plumbing system.

28 Claims, 6 Drawing Sheets

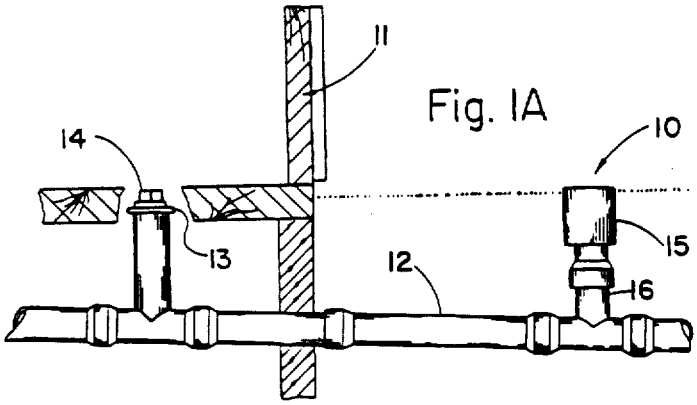
Fig. 1A
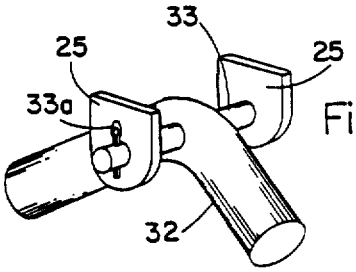
Fig. 2A
Fig. 2
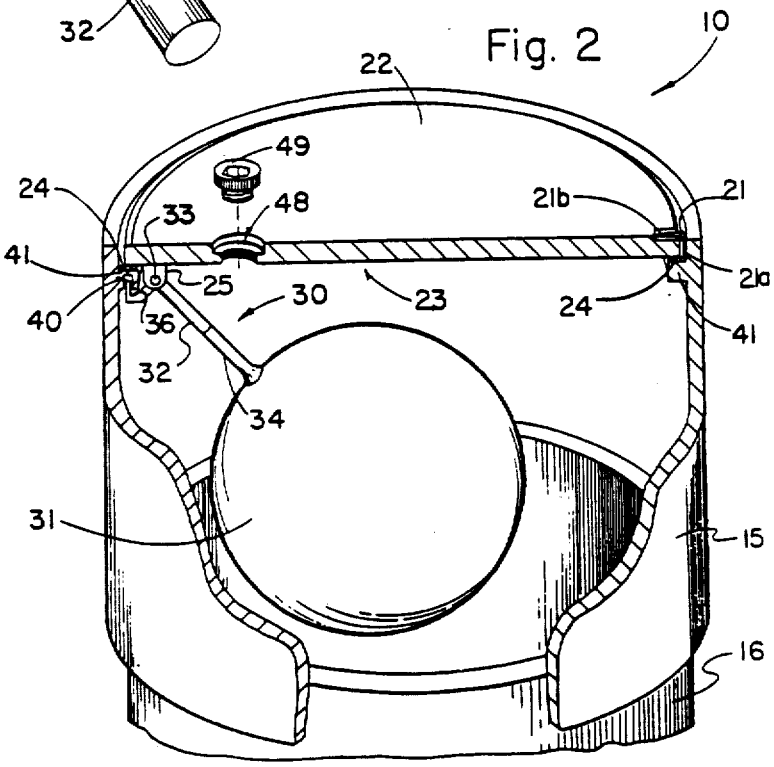

SEWER RELIEF VALVE

Matter enclosed in heavy brackets [ ] appears in the original patent but forms no part of this reissue specification; matter printed in italics indicates the additions made by reissue.

TECHNICAL FIELD

The present invention relates to plumbing systems, and more particularly, relates to an improved sewer relief valve for a plumbing system.

BACKGROUND OF THE INVENTION

A basic problem with residential and commercial plumbing systems is the back flow of sewage and drain water into the plumbing fixtures of a sewage generating facility due to a blockage or an obstruction of the sewer line. This problem is amplified where the sewage generating facility comprises an apartment building, an office building, or a similar multi-unit structure having a large number of drain fixtures therein. Hospitals, food handling or food service establishments and like structures are of particular concern because the back flow of any sewage into such facilities presents even greater opportunity for serious health hazards. In order to provide access to such blockages and obstructions, plumbing codes require commercial and residential plumbing systems to include sewer cleanouts throughout the system, both within the sewage generating facility and between the sewage generating facility and a sewage collection facility. Typically, a sewer cleanout comprises a threadably sealed plug secured to the uppermost portion of a T-fitting in the sewer line. When a blockage of the sewer lines occurs, access, thereto is provided by removing the plug. However, because the typical sewer cleanout is only intended to provide access to a sewer line, it is not designed to solve the more immediate problem of preventing the back flow of sewage into the drain fixtures of the sewage generating facility.

Various devices are known in the prior art purporting to solve this problem. Devices have been provided as shown in U.S. Pat. No. 4,261,386, wherein a cap is removably secured to the uppermost portion of a conventional T-fitting. As sewage enters the shank of the T-fitting, the air pressure therein will increase. When sufficient pressure has accumulated, the cap is forceably ejected from the fitting and the sewage escapes the system through the opening in the top of the shank.

Problems exist, however, with such prior art devices. For example, a plumbing system will commonly sustain minor blockages of a sewer line. These blockages are often purged from the sewer line by the increased pressure which results from normal use of the system. A plumbing system therefore experiences normal pressure fluctuations due to minor blockages. Should the cap of the patented device be ejected by such pressure fluctuations, the device becomes an open vent for sewer gas because the cap does not automatically reclose. Furthermore, undesired foreign material such as rocks, sticks, garbage, subsurface water and rats, is thereby permitted to enter the system. Another problem with the patented device is that the cap is retained to the T-fitting solely by means of friction fitting gaskets. Such retention means are widely known to become undependable over time. A yet further problem is that no prior art device, including the patented sewer relief valve, is tamper-resistant. Such a feature is required by most plumbing codes throughout the United States. Thus, it is not surprising that such prior art devices are not widely used in the plumbing industry.

Another prior art device which purports to solve the basic problem of preventing the back flow of sewage into a sewage generating facility is a back water valve. Placed betweeen a sewage generating facility and a sewage collection facility, the typical back water valve includes a hinged door or swing gate which opens in the direction of normal sewage flow. In theory, a back flow of sewage closes the gate, thereby preventing any back flow into the sewage generating facility.

Although back water valves are widely used and often required by code, several problems persist. A back water valve functions only to stop sewage flowing from a sewage collection facility to a sewage generating facility. It does not prevent the sewage generating facility from being subjected to its own back flow of sewage which results after the valve has closed due to a back flow of sewage from the sewage collection facility. Furthermore, back water valves are recognized to be only partially effective because they obstruct sewage flow and collect foreign matter. Such a collection of foreign matter inhibits the valve's ability to function and, therefore, the back water valve itself becomes an obstruction of the sewer line.

SUMMARY OF THE INVENTION

The present invention solves the above-described problems in the prior art and the heretofore unsatisfactorily addressed plumbing problem of sewage back flow into a sewage generating facility by providing a sewer relief valve which is initially locked in a closed position, yet opens automatically in response to a back flow of sewage within a sewer line, thereby allowing sewage to be expelled to the surrounding exterior area rather than within the sewage generating facility.

Generally described, the sewer relief valve of the present invention comprises a closure means movable to block or unblock the material flow opening of the valve, a locking means, and a float means which operates to release the locking means whereby the closure means is opened in response to a back flow of sewage within a sewer line.

Stated more particularly, a first preferred embodiment of the present invention comprises a lid which blocks an opening at the uppermost portion of a coupling in an airtight and fluid-tight configuration. The lid is initially maintained in a locked position. A buoyant member is pivotally mounted to the lid. In response to a back flow of sewage and drain water, the air pressure within the coupling increases, exerts a force against the lid, and breaks the airtight or fluid-tight seal, thereby allowing the sewage to continue to rise within the coupling. In response to a further back flow of sewage and drain water in the coupling, the buoyant member is displaced and unlocks the lid. Yet further displacement of the buoyant member causes it to operatively contact and open the lid, thereby unblocking the material flow opening of the coupling. The sewage escapes the clogged sewer line through the material flow opening of the coupling and is expelled to the surrounding exterior area instead of backing up into the sewage generating facility.

In a second preferred embodiment of the present invention, the buoyant member is pivotally mounted to an interior wall of the coupling. In a third preferred embodiment of the present invention, the buoyant member is slidably disposed within the coupling. It will be appreciated that in all forms of the present invention, a sewer relief valve is provided which unblocks a material flow opening of a coupling responsive to a back flow of sewage and drain water within a plumbing system.

Thus, it is an object of the present invention to provide an improved sewer relief valve, which further provides for sewer cleanout.

It is a further object of the present invention to provide a sewer relief valve that prevents the back flow of any sewage into a sewage generating facility.

It is a further object of the present invention to provide a sewer relief valve that inhibits tampering with, vandalism of and precludes the introduction of foreign matter into a plumbing system.

It is a further object of the present invention to provide a sewer relief valve which provides means for the automatic opening of sealed lid in response to a back flow of sewage within a plumbing system.

It is a further object of the present invention to provide a sewer relief valve having a locking mechanism to secure a lid.

It is a further object to provide a sewer relief valve which is responsive to a build-up of pressure which results from a back flow of sewage within a plumbing system.

It is also an object of the present invention to provide a sewer relief valve which includes float means to release a locking mechanism so as to unblock the material flow opening of a sewer cleanout.

Other objects, features and advantages of the present invention will become apparent from reading the following specification when taken in conjunction with the accompanying drawings.

BRIEF DESCRIPTION OF THE DRAWINGS

FIG. 1A is a pictorial plan view of a typical plumbing system of a sewage generating facility including an embodiment of the sewer relief valve shown in FIG. 1.

FIG. 2 is a perspective view of the sewer relief valve of FIG. 1 with a portion cut away to show the internal workings of the valve.

FIG. 2A is a perspective view of a portion of the sewer relief valve of FIG. 1.

DETAILED DESCRIPTION

Figure 1:
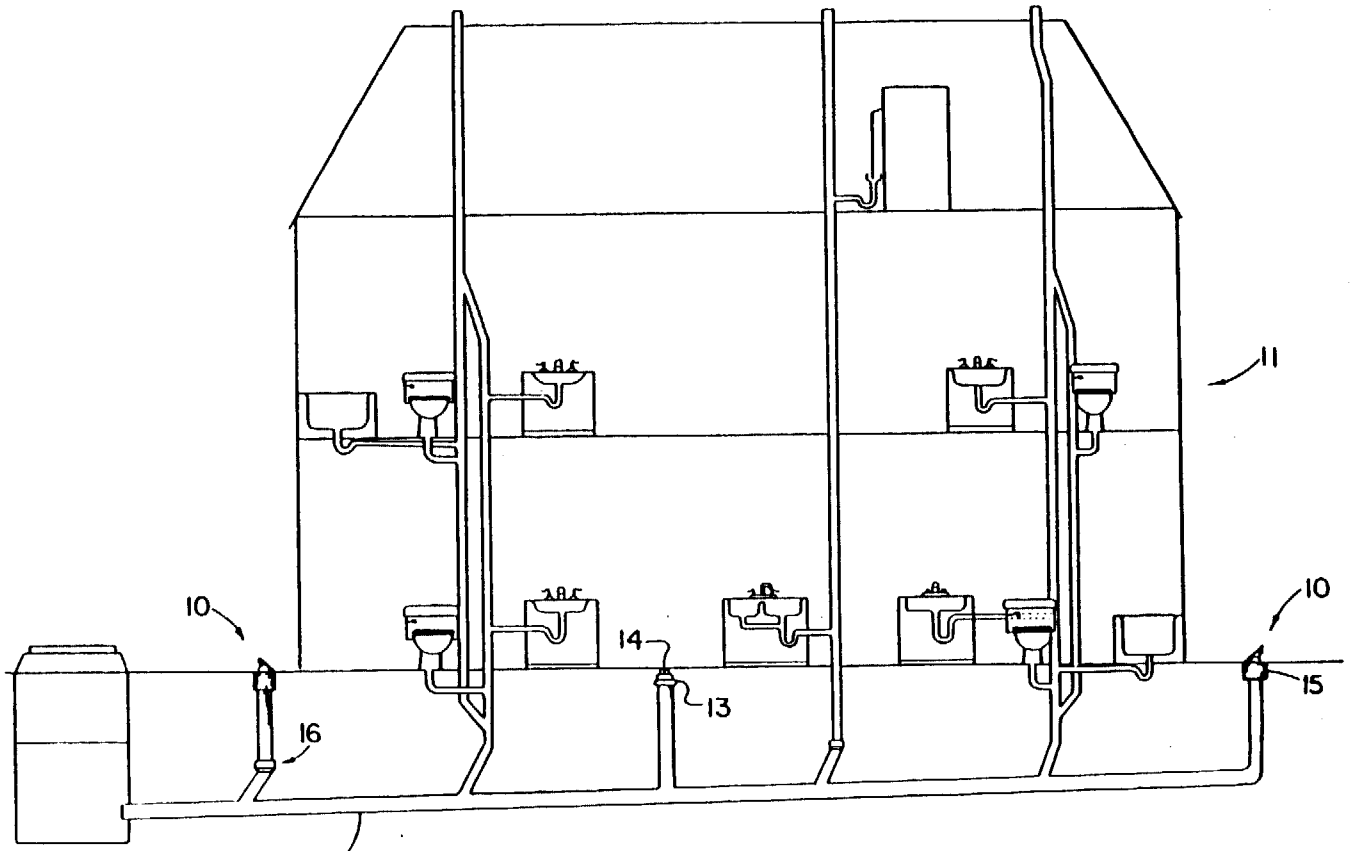
FIG. 1 is a pictorial plan view of a typical plumbing system of a sewage generating facility having two embodiments of the sewer relief valve according to the present invention secured thereto.

Referring now in more detail to the drawings, FIG. 1 shows a typical plumbing system including two sewer relief valves 10 according to the present invention. A first sewer relief valve 10 is located immediately to the right of a sewage generating facility 11. A second sewer relief valve 10 is located to the left of the facility 11. The sewage generating facility includes interior drain fixtures which empty wastes and drain water into a sewer line 12. It will be appreciated that the second relief valve is located between the sewage generating facility and a sewage collection facility—a manhole.

Located within the sewage generating facility 11 shown is a conventional interior sewer cleanout 13. A similar cleanout 13 is shown in FIG. 1A. Conventional sewer cleanouts are also frequently provided at various locations exterior to a sewage generating facility. The cleanouts 13 include conventional prior art seal plugs 14 which block the respective material flow openings of the cleanouts. The plugs 14 are threadably retained within their respective cleanouts 13. The intended function of such cleanouts 13 is merely to provide access to the sewer line 12. For example, should an obstruction develop in the sewer line 12, pressure within the plumbing system will increase. This increased pressure is a result of continued use of the system and may include air pressure, fluid pressure and/or the pressure exerted by any physical matter contained within the system. An exterior cleanout is first opened to relieve such increased pressure. An interior cleanout 13 is unsuited for such pressure relief because opening of the plug 14 would cause sewage to be expelled within the facility. However, once the pressure is normalized, loosening and removing the plug 14 will provide access to an obstruction of the sewer line 12. Typically, an auger, plumber's snake or similar tool is inserted into the sewer line 12 at the cleanout 13 to clear such an obstruction.

FIGS. 1 and 1A further show the sewer relief valve 10 of the present invention to be contained within a coupling member 15 which is connected in an airtight and fluid-tight manner to a T-fitting 16. The T-fitting 16 is likewise secured within the main sewer line 12. Such a T-fitting 16 is well known in the art and hence, need not be disclosed further herein. The seal between the coupling 15 and the T-fitting 16 may be formed utilizing any conventional adhesive, welding or soldering technique, or any other suitable means of connection. Thus, it will be appreciated by one skilled in the art that the present invention is suitable for use with any plumbing system.

The present invention is disclosed herein with regard to three preferred embodiments. The first preferred embodiment comprises a float assembly pivotally mounted or otherwise secured to carrier posts which depend from the underside of the valid lid. The second embodiment comprises a similarly pivotally mounted float assembly secured to an interior wall of the valve coupling. The third and final preferred embodiment comprises a float assembly which is slidably disposed within the valve coupling. A reading of the following specification will reveal that each preferred embodiment of the present invention provides a sewer relief valve that is initially in a locked and sealed posture, yet operates in response to a backflow of sewage to relieve a build up of pressure within the coupling and automatically opens so as to expel such back flow of sewage to the exterior area.

An example of the first preferred embodiment of the invention is shown in FIG. 2. In this example, a coupling member 15 is secured in an airtight and fluid-tight configuration to the uppermost portion of a T-fitting 16. The coupling member 15 includes an annular shoulder 41. The coupling 15 and shoulder 41 may be formed of any suitable corrosive-resistant, non-porous material. Suitable materials therefore include, but are not limited to, brass, cast iron, steel, plastic or aluminum. A primary consideration of material selection is that the coupling 15 provide a durable housing for the internal workings of the valve 10.

A hinge 21 is provided having two hinge plates 21a and 21b. A lid 22 is also provided to block a material flow opening 23 of the coupling 15. The hinge 21 facilitates pivotal movement of the lid 22. Various means of affixing the hinge plates 21a and 21b to the interior wall of the coupling 15 and the lid 22, respectively, are known in the art, and therefore need not be disclosed in further detail. The lid 22 of this example is circular in shape and extends substantially across the material flow opening 23 at the top of the coupling 15. One skilled in the art will appreciate that the lid 22 may be formed having any number of shapes or configurations so long as it provides a means of blocking the material flow opening 23 of the coupling 15. When the sewer cleanout relief valve 10 is in a closed position, the lid 22 rests upon and engages a gasket member 24. The gasket 24, in turn, rests upon the shoulder 41. The gasket 24 may be formed of any suitable material including neoprene or the like. It will be appreciated that the lid 22, in combination with the gasket 24, provides an airtight and fluid-tight seal of the material flow opening 23. It will be further appreciated that the hinge 21 defines an axis about which the lid 22 pivotally opens.

The preferred lid 22 of this first example further includes a pair of carrier posts 25 upon which a float assembly 30 is mounted. The carrier posts 25 are positioned opposite of the hinge 21. The carrier posts 25 may be formed as separate elements for attachment to the underside of the lid 22, or may be formed integrally with the lid to provide a unitary structure. Each carrier post 25 is formed having an aperture through which a pivot pin 33 is inserted. As described in detail below, the float assembly 30 is mounted for pivotal movement about the pivot pin 33.

The float assembly 30 of this example consists of a float ball 31, a pivot arm 32 and a pivot pin 33. The present float ball 31 is round in shape and may be formed of any corrosive-resistant material suitable to provide a buoyant member. Suitable construction materials therefore include, but are not limited to, copper and plastic sheeting, and styrofoam. The float ball 31 is secured to the pivot arm 32 by an interconnecting member 34. Interconnecting member 34 is threadably received at its upper end by the pivot arm 32, and is secured at its base to the float ball 31. The float ball 31 is formed integrally with the interconnecting member 34, or may be formed to be threadably received by the interconnecting member. One skilled in the art will appreciate that either construction permits simple and quick replacement of the float ball 31. Should such replacement be required, the float ball 31 and interconnecting member 34 are simply unscrewed from their engagement to the pivot arm 32 and a new float ball and interconnecting member and then rethreaded upon the pivot arm 32.

As shown best in FIG. 2A, the pivot arm 32 is mounted to pivot pin 33, which is pivotally carried by carrier posts 25. The pivot pin 33 extends through the aperture in the carrier post 25, and through the corresponding aperture in the other carrier post 25. The pivot pin 33 is retained in such position by two cotter pins 33a. Of course, any conventional means of fastening the pivot pin 33 in such position is suitable for practice of the present invention. The pivot pin 33, therefore, supports not only the weight of the pivot arm 32, but provides an axis about which the pivot arm, and hence the entire float assembly 30, moves. It will be appreciated that the entire float assembly 30 may be formed as a unitary structure so long as the pivotal movement of the float assembly is provided.

The pivot arm 32 further includes a latch extension 36. When the lid 22 is in a closed position (as shown in FIG. 2), the latch extension 36 rests within a cavity 40 of the shoulder 41. The shoulder 41 is affixed to or formed integrally with the interior wall of the coupling 15. The cavity 40 is positioned opposite of the hinge 21. The cavity 40 is of sufficient dimension to receive the latch extension 36 of the pivot arm 32. It is to be noted that in this example of the invention, the latch extension 36 does not contact the ceiling of the cavity 40 or the base of the shoulder 41. As described below, the present example provides for a gap or "play" between the latch extension 36 and the shoulder 41.

In operation of this example of this first preferred embodiment, the sewer relief valve 10 is initially in a closed position as shown in FIG. 2. The lid 22 provides an airtight and fluid-tight seal of the material flow opening 23 of the coupling member 15, and the latch extension 36 of the pivot arm 32 rests within the cavity 40 of the shoulder 41. It will be appreciated that the sewer relief valve 10 is therefore in a locked position. For example, should the lid 22 be pulled upward, the latch extension 36 will be captured within the cavity 40 of the shoulder 41. The lid 22 will thus be retained in its closed and locked position. The plumbing system is thereby secured from vandalism, tampering, or the like.

However, assuming an obstruction of the main sewer line 12 develops, sewage and drain water will back flow from the point of blockage to the T-fitting 16. As the sewage and drain water back up into the T-fitting 16, the air trapped within the T-fitting and the coupling 15 is compressed. Further back flow increases the air pressure until such force is exerted against the lid 22 that it is disengaged from the gasket 24. The air pressure is thereby relieved to permit the sewage and drain water to rise even further within the coupling 15. Thus, it will be appreciated that the valve 10 provides a vent in response to a build-up of air pressure within the coupling. One skilled in the art will appreciate that the heavier the lid 22, the greater the increase of air pressure build-up required to disengage the lid 22 from the gasket 24. Of course, other means of alleviating air pressure build-up could be provided. One skilled in the art will further appreciate that the present valve 10 accommodates the common pressure fluctuations experienced by a plumbing system. Once the pressure has returned to normal, the lid 22 will fall into engagement with the gasket 24. Thus, the airtight and fluid-tight seal of the material flow opening 23 is automatically regained.

Even when the valve 10 is operating as a vent, the lid 22 remains locked. The upward movement of the lid 22 which results from a build-up of air pressure also brings the latch extension 36 into contact with the ceiling of the cavity 40. Thus, one skilled in the art will also appreciate that the lid 22 is permitted to rise only a distance equal to the size of the gap between the latch extension 36 and the ceiling of the cavity 40.

Figure 2B:
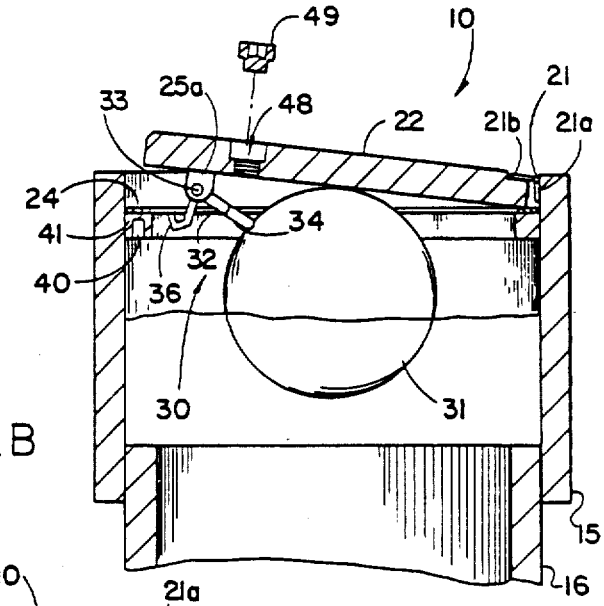
FIG. 2B is a cross-sectional view of the example in FIG. 1 showing the sewer relief valve in an unlocked and opened state.

As the sewage and drain water rise even further within the T-fitting 16, the float ball 31 will be vertically displaced and cause the pivot arm 32 to rotate about the pivot pin 33. The latch extension 36 will move downwardly out of the cavity 40 of shoulder 41. Once the latch extension 36 is free of the shoulder 41, it will be appreciated that the sewer relief valve 10 is unlocked and the lid 22 is ready for opening. As the rising sewage and drain water continues to vertically displace the float ball 31, it will contact the bottom surface of the lid 22. As shown in FIG. 2B, the float ball 31 will then exert a positive upward force upon the lid 22, causing it to open pivotally about hinge 21. The sewage and drain water then escape the plumbing system through the material flow opening 23 of the coupling 15 and are expelled the surrounding exterior area instead of backing up into the drain fixtures of the sewage generating facility 11. To clear the obstruction, the lid 22 is opened completely about hinge 21 to provide full access to the sewer line 12. Optionally, the float assembly 30, and in particular the float ball 31, may be removed from the coupling 15. An auger or like device may then be inserted through the material flow opening 23 of the coupling 15 to engage and dislodge any blockage.

Should inspection or repair of this first embodiment of the present invention be required, the preferred lid 22 is formed having an opening 48 located immediately above the pivot arm 32. A plug 49 is threadably received within said opening 48 so as to maintain the airtight and fluid-tight seal provided by the lid 22. The plug 49 of this example is formed having a flushed vandal-resistant fitting such as an "allen head" fitting, which is suitable for opening by an "allen wrench". Of course, other plug configurations could be provided. One skilled in the art will appreciate that the present valve 10 is designed for opening under normal conditions by a plumber or like professional should such be required. To open sewer relief valve 10, the plug 49 is removed from the opening 48 is the usual manner to provide access to the float assembly 30. A hooked member (not shown) may be inserted through the opening 48 to engage the pivot arm 32. An upward pull of the pivot arm 32 by the hooked member causes the pivot arm to rotate about the pivot pin 33, and releases latch extension 36 from cavity 40. This unlocks the sewer relief valve 10 and facilitates opening of the lid 22.

This first example further includes an automatic relocking feature. Once the sewer line 12 has been cleared of the obstruction, the lid 22 is retained to a closed position to seal the valve 10. One skilled in the art will appreciate that the float ball 31 will pivotally gravitate to the lowest position. Thus, as the lid 22 is closed, the latch extension 36 will ride against the outer wall of the shoulder 41. When the latch extension 36 clears the shoulder 41, the weight of the float ball 31 will cause the pivot arm 32 to rotate in a clockwise direction. This rotation will bring the latch extension 36 once again within the cavity 40 of the shoulder 41. The valve 10 is thus automatically relocked.

Figure 3:
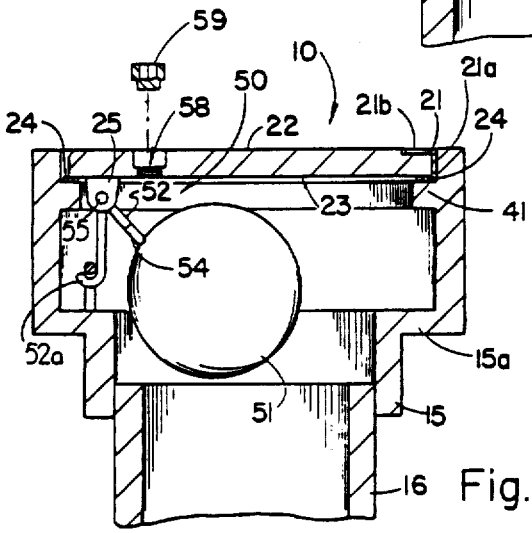
FIG. 3 is a cross-sectional view of a second example of a sewer relief valve according to the present invention.

A second example of this first preferred embodiment of the present invention is shown in FIG. 3. A coupling member 15 formed with a flanged extension 15a is secured in an airtight and fluid-tight configuration to the uppermost portion of a T-fitting 16. The coupling 15 includes an annular shoulder 41. As in the first example, a lid 22 is secured to the interior wall of the coupling 15 by a hinge 21. Thus, the lid 22 pivotally opens about the hinge 21. The lid 22 engages a gasket member 24 to provide an airtight and fluid-tight seal to a material flow opening 23 of the coupling 15.

The lid 22 of this example further includes two carrier posts 25 which carry a float assembly 50. The float assembly 50 comprises a float ball 51, a pivot arm 52 and a lock bar 53. The buoyant float ball 51 is threadably secured to the locking arm 52 by interconnecting member 54 and thus, replacement of the float ball is easily accomplished as previously described. The pivot arm 52 of this example is pivotally mounted to the carrier posts 25 by a pivot pin 55. The pivot pin 55 extends through an aperture in the first carrier post 25 and through a corresponding aperture in the other carrier post 25. Thus, it will be appreciated by one skilled in the art that this example of the present invention also provides for the float assembly 50 to be pivotally mounted to the carrier posts 25.

The base of the pivot arm 52 is provided with an integrally formed extension 52a having a hook-like construction designed to engage a lock bar 53. The lock bar 53 comprises a looped or inverted U-shaped member secured at its ends to the flanged portion 15a of the coupling 15. One skilled in the art will appreciate that the extension 52a of the pivot arm 52 and the lock bar 53 may be formed in any number of shapes or configurations. Furthermore, the pivot arm 52 and lock bar 53 may be formed of any corrosive-resistant material. When the lid 22 is in a closed position (as shown in FIG. 3), the hook extension 52a of the pivot arm 52 is inserted through and retained within the lock bar loop 53. It is to be noted that a gap is provided therebetween so as to provide for the air pressure responsive features of the present invention.

It will be appreciated by those skilled in the art that the lid 22 is initially maintained in a locked position. Any attempt to open the lid 22 while the pivot arm 52 is engaged to the lock bar 53 will result in the hook extension 52a being captured and held by the lock bar to prevent opening of the lid. However, should an obstruction of the sewer line 12 develop, and sewage flow back into the coupling 15, the lid 22 will rise to vent the resulting build-up of air pressure. The lid 22 will rise a distance equal to the gap between the pivot arm 52 and the lock bar 53. Furthermore, the lid 22 will be in a locked position when the valve 10 is operating to vent the increased air pressure. As the sewage then flows back further into the coupling 15, the float ball 51 will be displaced vertically and pivot the entire float assembly 50 about the pivot pin 55. Such action of the float assembly 50 disengages the hook extension 52a of the pivot arm 52 from the lock loop bar 53 and unlocks the lid 22. As the sewage level rises further within the coupling 15, the float ball 51 will contact the lid 22 and exert an upward force thereagainst to open the lid about hinge 21. The sewage then escapes the plumbing system through the material flow aperture 23 of the coupling 15 onto the surrounding exterior area.

It is to be noted that this example of the present invention also includes an opening 58 which provides access to the float assembly 50. The opening 58 is threadably closed by a plug 59, which may be suited for opening by an "allen wrench." Other fittings such as a lock key or the like may be provided. The opening 58 provides access to the float assembly 50 to unlock the lid 22 for service and repair, or to relock the lid after opening. It is to be further noted that this example of the invention will automatically relock as the level sewage and drain water lowers within the T-fitting 16.

Figure 4:
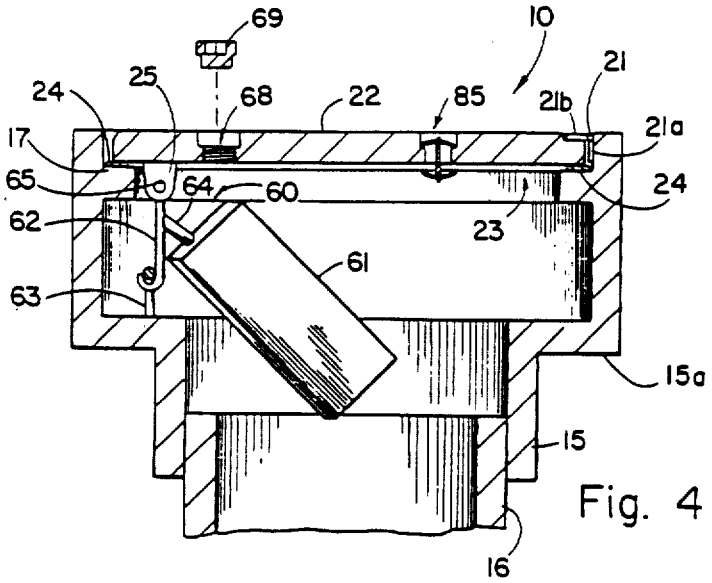
FIG. 4 is a cross-sectional view of anothe example of a sewer relief valve according to the present invention.
Figure 4A:
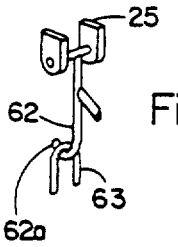
FIG. 4A is a partial perspective view of the example shown in FIG. 4.

A third example of this first embodiment of the invention is shown in FIG. 4. Again, a coupling member 15 is provided having a flanged portion 15a. A hinge 21 having a first hinge plate 21a and a second hinge plate 21b is secured to the interior wall of the coupling 15 and the lid 22. Thus, the lid 22 of this example is pivotally mounted to the coupling member 15 by the hinge 21. The lid 22 cooperates with a gasket 24 which rests on an annular shoulder 17 of the coupling 15 to provide an airtight and fluid-tight seal of the material flow aperture 23. As in previous examples of this embodiment of the invention, the lid 22 includes a pair of carrier posts 25. A float assembly 60 is pivotally mounted upon a pivot pin 65 extending between the carrier posts 25. The float assembly 60 of this third example includes a float rectangle 61, a pivot arm 62, a lock bar 63, and an interconnecting member 64. It is to be noted that the buoyant member 61 of this example differs in shape from that of the float previous balls 31 and 51 provided in the other examples. In particular, the present flow 61 is formed having a rectangular shape. It will therefore be appreciated that the float assembly may comprise a buoyant member having various shapes or configurations.

Further to this float assembly 60, the preferred float rectangle 61 is integrally formed with an interconnecting member 64. At its uppermost end, the preferred interconnecting member 64 of this example includes a threaded extension (not shown) which is threadably received by a pivot arm 62. Of course, the interconnecting member 64 could be formed integrally with the pivot arm 62, and the float rectangle 61 could be designed for threadable receipt by the interconnecting member. Either alternative fulfills the primary object of providing an easily replaced float member 61. The pivot arm 62 is secured to the carrier posts 25 by a pivot pin 65. The pivot pin 65 extends through an aperture in carrier post 25 and through a corresponding aperture in the other carrier post 25. Thus, the float assembly 60 is mounted upon the carrier posts 25 for pivotal movement with the pivot pin 65. The pivot arm 62 further includes a hook extension 62a which engages the pivot bar 63 so as to lock the lid 22 when the valve 10 is in a closed position. As in the immediately preceding example, the lock bar 63 is a looped member secured at its ends to the flange 15a of the coupling 15. It is to be noted that a gap is provided between the hook extension 62a of the pivot arm 62 and the lock bar 63. It will therefore be appreciated that the locking means of this embodiment of the invention is substantially identical to that shown in FIG. 3, and that various configurations could be provided.

In operation of this example, a blockage of the sewer line 12 would cause sewage to rise within the T-fitting 16 and further cause the air pressure to increase within the coupling 15. When the air pressure reaches a sufficient accumulation, the lid 22 would open to vent the build-up of air pressure and permit the sewage to rise yet further within the coupling 15. As in the preceding example, the lid 22 would be locked when operating as a vent. In this example, an alternative relief mechanism is shown. A relief valve 85 is provided which, responsive to an increase in air pressure, unblocks a second opening in the lid to vent such air pressure.

Once the pressure in the coupling 15 is normalized, the sewage would be permitted to rise. The rising sewage would vertically displace the float rectangle 61. This vertical movement of the float rectangle 61 disengages the hook extension 62a of the pivot arm 62 from the lock bar 63 so as to unlock the lid 22. Further displacement of the float rectangle 61 brings it to bear against the lid 22, which causes the lid to open pivotally about hinge 21. Thus, the material flow opening 23 is unblocked and the sewage back flow escapes the system. This embodiment of the present invention also includes an opening 68 having a flushed vandal-resistant plug 69 threadably retained therein. Removal of the plug 69 provides access to the float assembly 60 to unlock the lid 22 for service and repair, or to relock the lid after opening.

Figure 5:
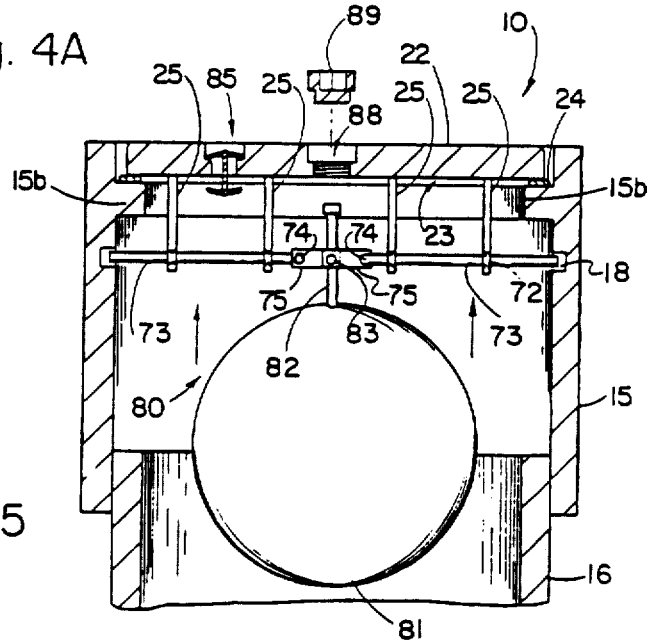
FIG. 5 is a cross-sectional view of another example of a sewer relief valve according to the present invention.

A fourth example of this first embodiment of the present invention is shown in FIG. 5. A coupling member 15 is secured to the uppermost portion of the T-fitting 16 and provided with an annular shoulder 15b. The coupling member 15 is further formed having an indentation 18 in its interior wall. A lid 22 blocks the material flow opening 23 of the coupling 15 and engages a gasket 24 which rests on the shoulder 15b to provide an airtight and fluid-tight seal thereof. The lid 22 of this embodiment is formed having two pair of carrier posts 25 which depend therefrom and extend into the interior of the coupling 15. Each carrier post 25 is further formed including an aperture 72 at its lower end. Two elongate, horizontal lock rods 73 extend through the apertures 72 and are positioned for receipt by the indentations 18 at their outermost ends. It is to be understood that the carrier posts 25 are stationary members, and that the apertures 72 therein facilitate horizontal movement of the lock rods 73. The lock rods 73 are formed having an extension 74 at their inwardmost ends. The extensions 74 may be formed integrally with the rods 73, or formed for attachment thereto. The extension members 74 of the rods 73 are received by two plates 75. Each plate 75 is formed having a first aperture (not shown) at its outermost end. These apertures are suitable for receipt of the extension members 74 of the lock rods 73. Each plate 75 is further formed having a second aperture (not shown). As described below in detail, these second apertures facilitate attachment of the float assembly 80 to the plates 75.

The present float assembly 80 includes a float ball 81 integrally formed with an interconnecting member 82. The interconnecting member 82 includes an extension member 83 which projects outwardly therefrom and is inserted through the second apertures of the plates 75.

One skilled in the art will appreciate that the two plates 75 are therefore pivotally mounted at their outer ends by the extension members 74 of the lock rods 73, and pivotally mounted at their inner ends by the extension member 83 of the interconnecting member 82.

In operation of this example, it will first be appreciated that the lid 22 is initially maintained in a locked position. The lock rods 73 are of sufficient length to extend into the indentions 18 in the coupling 15. Thus, any upward movement of the lid 22 causes the rods to be caught and restrained by the ceiling of the indentation 18, thereby preventing any opening of the lid. It is to be noted that the present example provides a relief valve 85 to alleviate the build-up of air pressure that results from a back flow of sewage into the T-fitting 16. The pressure relief valve 85 operates to provide an opening in the lid 22 for the compressed air which results from such a back flow of sewage. As the compressed air exerts a force on the lid 22, the upper seat of the pressure relief valve 85 is pushed from its engagement to the lid 22. The compressed air within the coupling 15 and T-fitting 16 thereby escapes to the atmosphere while the lid is maintained in a locked position. As sewage and drain water then rise in the coupling 15, the float ball 81 and the interconnecting member 82 will be displaced vertically. The plates 75 will be pulled upward at their innermost portions by the extension 83 of the interconnecting member. As the plates 75 are rotated upward by the extension member 83 of the interconnecting member 82, the lock rods 73 are pulled inward through the apertures 72 by means of extension members 74. One skilled in the art will appreciate that when the float ball 81 is displaced a sufficient distance, the lock rods 73 will clear the indentation 18 and the valve 10 will be unlocked. A further rise in the sewage level within the coupling will cause the extension 83 to butt the lid 22 and unblock the material flow opening 23 thereof.

It is to also be noted that this embodiment is provided with an opening 88 in the lid 22 within which plug 89 is threadably retained. This opening 88 provides access to the extension rod 82 so as to open the lid 22 for service and repair and to relock the lid after opening.

A related concept includes the extention of the interconnecting member 82 so as to place the float ball 81 at a position immediately above the normal fluid level of the sewer line 12. As sewage rises within the T-fitting 16, the float ball 81 and interconnecting member 82 would rise responsively. The lock rods 73 would be withdrawn from the indentations 18, and the lid 22 would be open. One skilled in the art will recognize this concept to alleviate the need for an air pressure relief. The lid 22 would be opened before sufficient air pressure could accumulate within the T-fitting 16 and coupling 15 to prevent any rise of sewage and drain water therein. One skilled in the art will therefore further appreciate this concept of the present invention to be responsive solely to sewage back flow, and not subject to a build-up of air pressure within the coupling and T-fitting.

Figure 6A:
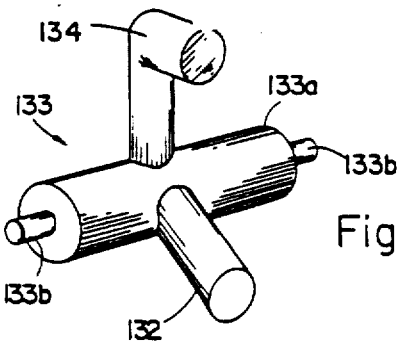
FIG. 6A is a partial perspective view of the example shown in FIG. 6.
Figure 6:
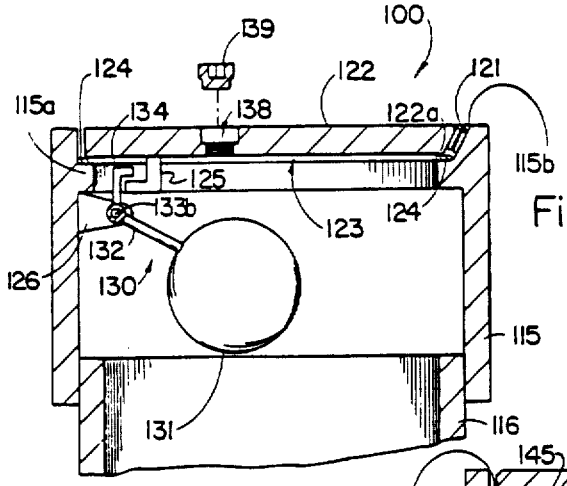
FIG. 6 is a cross-sectional view of a first example of a second embodiment of a sewer relief valve according to the present invention.
Figure 7:
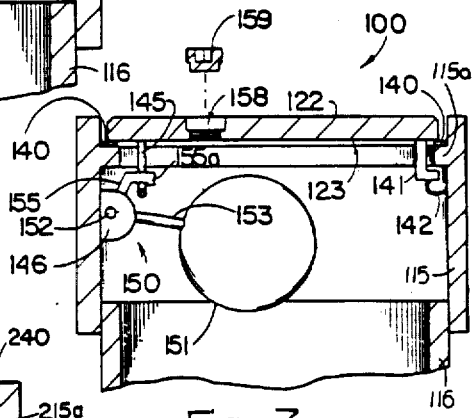
FIG. 7 is a cross-sectional view of a second example of the second embodiment of a sewer relief valve according to the present invention.

A second embodiment of the present invention is shown at 100 in FIGS. 6 and 7. It is to be appreciated that the primary variation from the first embodiment of the invention shown in FIGS. 1 through 5 is the positioning of the float assembly carrier posts on an internal wall of the coupling, as opposed to depending from the undersurface of the lid. It will be appreciated that this form of the invention also provides a sewer relief valve which is initially maintained in a locked position, and automatically opens responsive to a back flow of sewage in the coupling.

A first example of this second embodiment of the invention is shown in FIG. 6, wherein a coupling 115 is secured in a fluid-tight and airtight fashion to a T-fitting 116 of a plumbing system. A first portion of the coupling 115 includes a shoulder 115a, a portion thereof including a beveled edge 115b. A hinge 121 is provided with a first hinge plate secured to the beveled face 115b. A second hinge plate is secured to a correspondingly beveled edge 122a of a lid 122. Thus, the lid 122 of this embodiment is mounted directly to the coupling 115 for pivotal movement about the hinge 121. The lid 122 engages a gasket 124 which rests on the shoulder 115a to provide an airtight and fluid-tight seal of the material flow opening of the coupling 115. The lid 122 also includes a locking seat 125 which may be formed either integrally with the lid or secured thereto in any conventional manner. The locking seat 125 of this example has an L-shape and may be formed of any suitable non-corrosive material including brass, plastic or cast iron. One skilled in the art will appreciate that the locking seat 125 may be formed in any number of shapes and configurations.

In keeping with this embodiment of the invention, a pair of carrier posts 126 are secured to the interior wall of the coupling 115 at a position opposite the hinge 121. The carrier posts 126 each include an aperture and are formed of a non-corrosive material of sufficient strength to support the weight and action of a float assembly 130. The float assembly 130 of this example of the invention consists of a float ball 131, a pivot arm 132, a pivot pin 133 and a lock arm 134. The float ball 131 comprises a buoyant member which depends from the pivot arm 132. The float ball 131 of this example is formed integrally with one end of the pivot arm 132. The other end of the pivot arm 132 is threadedly fixed to the mounting pin 133 (shown best in FIG. 6A). Thus, it will be appreciated that the float ball 131 and pivot arm 132 are designed for easy and quick replacement, should it be required.

The preferred pivot pin 133, shown in detail in FIG. 6A, includes an enlarged cylindrical portion 133a formed with two smaller cylindrical extensions 133b extending therefrom. The pivot pin 133 further includes two threaded openings (not shown) for receipt of the pivot arm 132 and the lock arm 134. The cylindrical extensions 133b are inserted through and retained within the apertures in the carrier posts 126 to permit rotation of the pin. Thus, the float ball 131, the pivot arm 132 and the lock arm 134 are mounted for pivotal movement about an axis defined by the cylindrical extensions 133b of the pivot pin 133. Of course, the float ball 131, the pivot arm 132, the pivot pin 133 and the lock arm 134 may be formed as a unitary structure. Thus, it is to be understood that numerous modifications may be made in the design of the pivot pin 133 and the float assembly 130.

The lock bar 134 of this example, as shown in FIG. 6, is an inverted L-shaped member and is threadably secured to the enlarged cylindrical portion 133a of the pivot pin 133. When the lid 122 is in a closed position, the horizontal extension of the lock bar 134 rests within the locking seat 125. It is to be noted that a gap is provided therebetween to facilitate air pressure relief as discussed below. One skilled in the art will appreciate that the lid 122 is thus maintained in a locked position.

If the lid 122 is pulled upward about its hinge 121, the lock seat 125 will be caught and retained by the horizontal extension of the lock bar 134. Upon a blockage of the sewer line 12, sewage and drain water will back flow into the coupling 115. The air trapped within the T-fitting 116 and coupling 115 will compress, and exert an upward force against the lid. Upon a sufficient buildup of air pressure, the lid 122 will disengage from the gasket 124 so as to vent the compressed air. The air pressure will return to normal and the sewage will continue to rise within the coupling 115. It will therefore be appreciated that even when venting compressed air, the present valve 10 is maintained in a locked posture. As the sewage rises further within the coupling 115, it will displace the float ball 131 and cause the entire float assembly 130 to pivot about the pivot pin 133. The lock arm 134 will disengage from the locking seat 125 and the lid 122 will be released and readied for opening about the hinge 121. This example of the invention therefore contemplates that the material flow opening be unblocked by the rising sewage as it escapes the plumbing system.

It is to be also noted that this embodiment also provides an opening 138 and a threadably secured vandal-resistant plug 139 therefor. The opening 138 provides access to the float assembly 130 to permit opening of the lid 122 for repair and inspection, and relocking of the lid.

A second example of this second embodiment of the invention is shown in FIG. 7. A coupling 115 having an annular shoulder 115a is provided at the uppermost portion of the T-fitting 116. A lid 122 rests upon the should 115a when in a closed position. Secured between the underside of the lid 122 and the coupling shoulder 115a is a gasket 140. Thus, one skilled in the art will appreciate that the lid 122 provides an airtight and fluid-tight seal of the material flow aperture of the coupling 115.

Figure 7A:
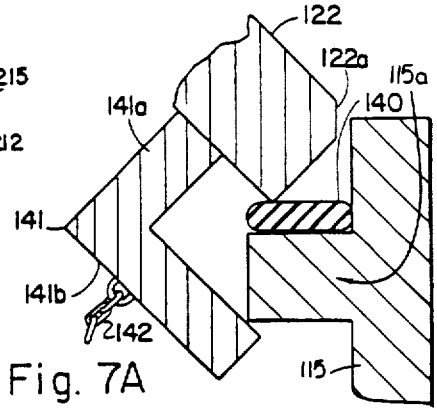
FIG. 7A is a partial perspective view of the example shown in FIG. 7.

The lid 122 of this embodiment further includes an elbow fitting 141 which is operatively associated with the shoulder 115a to provide a hinge. As shown in FIG. 7A, the elbow fitting 141 consists of a vertical extension 141a secured at its uppermost edge to the lid 122, and a horizontal extension 141b. The elbow fitting 141 could, of course, be formed integrally with the lid 122. One skilled in the art will appreciate that the elbow fitting 141, in combination with the shoulder 115a of the coupling 115, provides for hinge movement of the lid 122. As the lid 122 is opened, the lowermost right corner of the elbow fitting 141 (as shown in cross-section in FIG. 7A) will provide a pivot point about which the lid will open. The weight and action of the lid 122 will be borne by the shoulder 115a of the coupling 115. The lid 122 is further formed having a beveled edge 122a to facilitate maximum movement of the lid as it is being opened. A chain member 142 attaches to the horizontal extension 141b of the elbow 141 and the inner wall of the coupling 115 to insure connection of the lid 122 to the coupling.

As shown in FIG. 7, the lid 122 is further formed with a lock bar 145 extending into the coupling 115 from the underside thereof. The lock bar 145 comprises a looped member formed of any suitable corrosive-resistant material. The lock bar 145 may be formed integrally with the lid 122 or may be secured thereto in any conventional manner. Of course, various modifications could be made in the shape of the lock bar 145.

In keeping with this second embodiment of the present invention, this example further includes a pair of carrier posts 146 which are secured to the interior wall of the coupling 115 and have respective apertures extending therethrough to support, receive and maintain the float assembly 150. The float assembly 150 of this example consists of a float ball 151, a pivot pin 152, a pivot arm 153, and a locking arm 155. The float ball 151 of this example is formed integrally with a first end of the pivot arm 153. The other end of the pivot arm 153 is affixed to the pivot member 152. As described previously, various means of securing the pivot arm 153 to the pivot pin 152 and float ball 151 could be utilized.

A locking arm 155 is secured to the pivot pin 152. The locking arm 155 of this example comprises an inverted L-shaped member with the horizontal extension thereof designed for insertion within the lock bar 145. It will therefore be appreciated that when the valve 10 is in a closed position, the horizontal extension of the locking arm 155 is inserted through the opening of the looped lock bar 145. It is to be noted that a gap is provided therebetween so as to relieve air pressure as described below. The locking arm 155 is further formed having a latch extension 155a which prevents inadvertent removal of the locking arm from the lock bar 145. It will thus be appreciated that this example of the sewer relief valve, as shown in in FIG. 7, is in a locked position. If the lid 122 is pulled upward from its engagement to the gasket 140, the lock bar 145 will be captured and retained by the locking arm 155. However, should a blockage of the sewer line 12 occur, sewage and drain water will back flow into the T-fitting 116 and compress the air trapped therein. Upon a sufficient accumulation of pressure, the lid 122 will be forced open until caught by locking arm 155. After the air pressure has been normalized, the sewage will rise further within the T-fitting 116. Upon reaching the coupling 115, the entire float assembly 150 will pivot about the mounting pin 152, and the locking arm 155 and latch extension 155a will move outwardly from the lock bar 145. The lid 122 is thus unlocked and readied for opening. This example of the invention also provides for the rising sewage to open the lid 122. As in previous embodiments, the lid 122 is formed having an opening 158 and a vandal-resistant plug 159 threadably secured therein. Access is thereby provided to the internal workings of the valve 10 for repair, inspection, relocking or otherwise.

Figure 8:
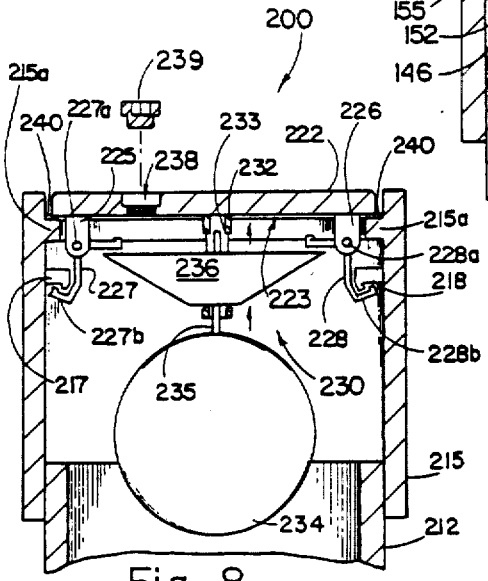
FIG. 8 is a cross-sectional view of a first example of a third embodiment of a sewer relief valve according to the present invention.
Figure 10:
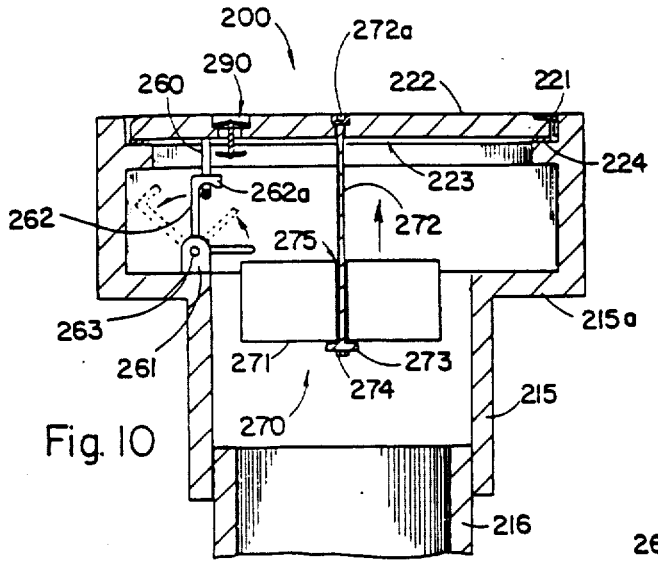
FIG. 10 is a cross-sectional view of a third example of the third embodiment of a sewer relief valve according to the present invention.
Figure 9:
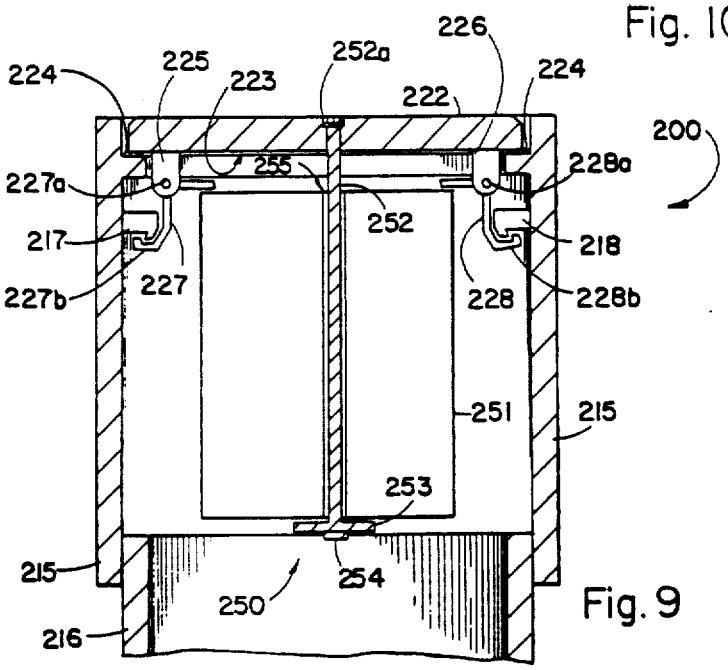
FIG. 9 is a cross-sectional view of a second example of the third embodiment of a sewer relief valve according to the present invention.

A third embodiment of the present invention is shown in FIGS. 8–10, wherein float means are slidably disposed within a coupling to facilitate unlocking and opening of the lid responsive to a back flow of sewage and drain water within the sewer line.

A first example of this embodiment of the present invention is shown at 200 in FIG. 8, wherein a coupling 215 is provided in an airtight and fluid-tight configuration with a T-fitting 216. The coupling 215 includes an annular shoulder 215a which encompasses the interior circumference thereof. A lid 222 rests upon a gasket 240 which, in turn, rests upon the shoulder 215a when the valve 10 is in a closed position. The lid 222 therefore provides an airtight and fluid-tight seal if the material flow aperture of the coupling 215. It is to be noted that the coupling 215 is further formed to have projections 217 and 218, the function of which will be described in detail below.

The lid 222 of this preferred embodiment includes two pairs of carrier posts 225 and 226, upon which are pivotally mounted two locking elbows 227 and 228, respectively. Positioned on opposite sides of the coupling 215, the respective carrier posts 225 and 226 are either formed integrally with the lid 222 or are secured thereto in any conventional manner. The carrier posts 225 and 226 are further formed having respective apertures which facilitate mounting of the locking elbows 227 and 228 therein.

The lock elbows 227 and 228 of this example are L-shaped members which comprise the locking mechanism. The lock elbows 227 and 228 are mounted to the carrier posts 225 and 226, respectively, by mounting pins 227a and 228a, respectively. The mounting pins 227a and 228a extend through the corresponding apertures in the carrier posts 225 and 226, respectively. Thus, the lock elbows 227 and 228 are mounted for pivotal movement about the respective mounting pins 227a and 228a. The lock elbows 227 and 228 further include latch extensions 227b and 228b, respectively. When the valve 10 is in a closed position, the latch extensions 227b and 228b rest immediately below the projections 217 and 218, each formed having yet further extensions which cooperate to prevent any inadvertent disengagement therefrom. It is to be noted that a gap is provided between the projections 217 and 218 and the latch extensions 227b and 228b, respectively. One skilled in the art will appreciate that the valve 10 is thus normally maintained in a locked position. Should the lid 22 be pulled upward, the latch extensions 227b and 228b of locking elbows 227 and 228, respectively, are caught and captured by projections 217 and 218 of the coupling 215. The lid 222 is thus retained in a locked position even when venting compressed air which results from a back flow of sewage within the sewer line.

The float assembly 230 of the embodiment is carried by a cylindrical member 232. The cylindrical member 232 may be formed integrally with the lid 222 or may be formed for attachment to the lid. The cylindrical member 232 is formed with a slot 233 extending therethrough which facilitates the movement of the float assembly 230. The float assembly 230 of this example consists of a float ball 234, an interconnecting member 235, and a latch release member 236. The float ball 234 is threadably secured to or integrally formed with the interconnecting member 235. The interconnecting member 235 is secured to the latch release member 236. Shown in FIG. 8 having a triangular shape, the latch release member 236 freely fits within the slot 233 in the cylindrical member 232. It is to be understood that the latch release 236 is slidably disposed within the slot 233. One skilled in the art will appreciate that the latch release member 236 may be of any configuration so long as it is of sufficient dimension to be received by the slot 233 in the cylindrical member 232 and engage the horizontal extensions of the locking elbows 227 and 228 as described below.

When the sewer relief valve 200 of this example is in a closed position, the float ball 234 gravitates to its lowest position and the base of the latch release 236 is pressed flush against the lowermost edge of the slot 233 in the cylindrical member 232. When sewage and drain water back flow into the coupling 215 due to a blockage of the sewer line 12, the air trapped therein is compressed. Upon a sufficient increase in air pressure, the lid 222 will be forced from its engagement to the gasket 224. The lid 222 is thus opened and the air pressure within the coupling 215 is normalized. It will be appreciated that the lid 222 will rise a distance equal to the gap between the locking elbows 227 and 228 and the projections 217 and 218. As the sewage level then rises further, the float ball 234 is vertically displaced and the interconnecting member 235 and latch release 236 also rise. The latch release 236 contacts the horizontal extensions of the locking elbows 227 and 228 and causes them to pivot about their respective mounting pins 227a and 228a. The latch extension 227b and 228b are therefore pivotally disengaged from the projections 217 and 218, respectively, of the coupling 215. The lid 222 is thus unlocked. Responsive to the yet further rising sewage and drain water, the interconnecting member 235 rises within the cylindrical member 232, and into contact with the ceiling of the slot 233. Since the cylindrical member 232 is secured to the lid 222, the lid 222 is thereby butted opened by the interconnecting member 235 and the material flow opening of the coupling 215 is unblocked to permit the sewage and drain water to exit the plumbing system.

The lid 222 of this example further includes an opening 238 within which is threadably secured by a vandal-resistant plug 239. The plug 239, which may be formed having an "allen head" fitting, is secured flush within the opening 238. Removal of the plug 239 provides access to the float assembly 230 and thus the lid 222 may be opened for repair, service or relocking. An aperture (not shown) may be provided in the latch release member 236 for insertion of a hooked member to pull the latch release member upward and thereby unlock the valve.

One skilled in the art will appreciate that this example may be readily adapted for response to sewage back flow only. As discussed earlier, the interconnecting member 235 could be extended so as to place the float ball 234 at a position immediately above the normal fluid level of the sewer line. As the sewage would rise within the T-fitting 216, the float ball 234 and interconnecting member 235 would also rise. The latch release 236 would unlock the lid 222 as described above. One skilled in the art will recognize this concept of the invention to be responsive solely to sewage back flow since the lid 222 would be opened before sufficient air pressure could build up the coupling 215 and T-fitting 216 to prevent any rise of sewage therein.

The second example of this third embodiment of the invention is shown in FIG. 9. One skilled in the art will recognize that the coupling formation and locking mechanism of this embodiment are substantially identical to that of the embodiment shown in FIG. 8. In particular, a coupling 215 is provided having a shoulder 215a about its inner circumference. The coupling 215 is also formed having two projections 217 and 218 which extend inwardly from the interior wall of the coupling. A lid 222 is provided to block the material flow opening of the coupling 223. The lid 222 extends across the opening 223 and provides an airtight and fluid-tight seal of the opening 223 by engagement to a gasket member 224. Depending from the lid 222 are two pair of carrier posts 225 and 226. Mounted upon a pin 227a and 228a which extends between the two pair of carrier posts 225 and 226, respectively, are opposing lock bars 227 and 228. The lock bars further include latch extensions 227b and 228b which rest below the coupling indentations 217 and 218 when the valve 10 is in a closed and locked position.

However, this example provides a modified float assembly 250. As shown in FIG. 9, this preferred float assembly consists of a float 251, a supporting cylinder 252, a stop plate 253 and a locking member 254. The float 251 is cylindrical in shape and formed with a cylindrical opening 255 which extends longitudinally therethrough. A cylindrical supporting member 252 formed of any suitable non-corrosive material is threadably secured at its uppermost end to the lid 222. The cylindrical supporting member is formed having an "allen head" or like fitting 252a flush with the upper surface of the lid 222. It will be appreciated that any fitting may be used so long as it provides the tamper-resistant feature of the present invention. The supporting member 252 furthermore extends into the coupling 215, and is inserted through the opening 255 in the float 251. The float is secured to the cylinder 252 by a stop plate 253, which is in turn secured to the lowermost end of the cylinder 252 by a locking member 254. The locking member 254 may comprise a nut, clip, or like fastener. Thus, it will be appreciated that the float 251 rests upon the stop plate 253 when the valve 10 is in a closed position. However, when a blockage of the sewer line 12 occurs, the air trapped within the coupling 215 and T-fitting 216 will be compressed and exert an upward force against the lid 222. The lid 222, upon a sufficient accumulation of air pressure, will disengage from the gasket 224. The air pressure within the coupling 215 and T-fitting 216 will then normalize and the sewage will continue to rise. It is to be appreciated that the valve 10 remains in a locked position even when operating as a vent for the compressed air. Upon a further rise of sewage within the coupling 215, the float 251 is vertically displaced and the lock bars 227 and 228 are pivoted free of the coupling projections 217 and 218, similar to how the latch release member 236 unlocked the lid in the embodiment shown in FIG. 8. The lid 222 is thereby unlocked, and then opened by contact of the float 251 with the underside thereof upon further displacement by rising sewage.

To open the lid 222 for repair or otherwise, the threadably retained supporting cylinder 252 is rotated by means of the fitting 252a within the lid so as to raise the stop plate 253 and the float 251. The float will then rise to unlock the lid 222 through contact with the locking elbows 227 and 228.

The third example of this third embodiment of the invention is shown in FIG. 10. A coupling 215 is provided having a flanged portion 215a. A hinge 221 is secured to an interior wall of the coupling 215a and to the lid 222 to facilitate pivotal movement of the lid about the hinge. The lid 222 blocks the material flow opening 223 of the coupling 215 and provides an airtight and fluid-tight seal by means of its engagement to a gasket 224. The lid 222 of this example is formed having a lock bar 260 which extends from the underside of the lid and is located opposite the hinge 221. The lock bar 260 of this example is formed as a looped member of sufficient dimension to receive a latch extension 262a of a pivot arm 262 as described below. The lid 222 of this example is further formed having a pressure relief valve 290 which facilitates the expulsion of compressed air as also described below.

Figure 10A:
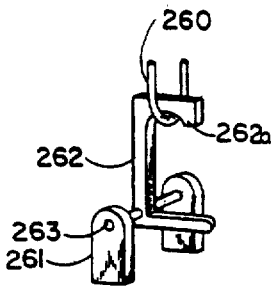
FIG. 10A is a partial perspective view of the example shown in FIG. 10.

The flanged portion 215a of the coupling 215 also supports a pair of carrier posts 261. Shown best in FIG. 10A, an L-shaped pivot arm 262 is mounted upon the carrier posts 261 by a pin 263. The mounting pin 263 freely extends through the apertures in the carrier posts 261. Thus, the pivot arm 262 rotates about an axis defined by the mounting pin 263. The pivot arm 262 of this example includes a latch extension 262a which, when the lid 222 is in a closed position, rests within the lock bar 260. The latch extension 262a is formed having an enlarged portion located at an inwardmost edge which prevents its inadvertent removal from the lock bar 260. Those skilled in the art will appreciate the pivot arm 262 and latch extension 262a may be formed various shapes and/or sizes.

In keeping with this embodiment of the invention, a slidably disposed float assembly 270 is provided including a float 271, a supporting cylinder 272, a stop plate 273 and a lock member 274. As in the example shown in FIG. 9, the float 271 is cylindrical in shape and formed having a longitudinal opening 275 extending vertically therethrough. The cylinder 272 extends through the opening 275 in the float member 271. The float 271 is retained to the cylinder 272 by a stop plate 273 affixed to the lowermost portion thereof by a locking member 274. The locking member 274 may be a pin, nut, or any other conventional fastener suitable to retain the stop plate 273 to the supporting cylinder 272. It will be appreciated that the float 271 is therefore slidably disposed along the supporting cylinder 272, with the stop plate 273 defining the lowermost possible position of the float.

The embodiment in FIG. 10 is shown in a locked position. Any attempt to open the lid 222 causes the lock bar 260 to be caught and retained by the latch extension 262a of the pivot arm 262. However, should a blockage of the sewer line 12 develop, and sewage and drain water back up into the coupling 215, the air trapped therein will be compressed. Upon a sufficient accumulation of pressure, the relief valve 290 will open a passageway for the compressed air to escape the system. Once the pressure within the coupling 215 is normalized, the sewage may rise further therein. One skilled in the art will therefore appreciate that no gap is needed between the lock bar 260 and the pivot arm latch extension 262a. However, such a gap does provide a back-up mechanism to insure that the valve 200 relieves such compresses air. It will be further appreciated that even when operating as a vent, the valve 200 is maintained in a locked and vandal-resistant position. When the sewage rises sufficiently, the float 271 will be vertically displaced. As the float 271 rises along the cylinder 272, it will engage the horizontal extension of the pivot arm 262. The pivot arm 262 will rotate about the axis defined by the mounting pin 263. The latch extension 262a will disengage from the lock bar 260 and the valve 10 will therefore be unlocked. Upon further displacement of the float 271, it will engage and open the lid 222. The rising sewage is then able to escape the plumbing system through the material flow opening of the coupling 215. As in the embodiment shown in FIG. 9, the supporting cylinder 272 may be unscrewed from the lid 222 by means of a fitting 272a. The lid 222 is thereby opened for repair, service, or inspection.

Thus, it is seen that the present invention, as disclosed in the above-described preferred embodiments, provides a significant improvement over the prior art. In particular, the present invention provides a tamper-proof sewer relief valve that opens automatically responsive to a back flow of sewage within a plumbing system. The lid of the valve is initially maintained in a sealed and locked posture. The seal may be broken to vent compressed air, or the lid may include a relief valve or like device to vent compresssed air, or the lid may be opened prior to any build up of air pressure. Those skilled in the art will recognize that the compressed air is vented to allow the sewage and drain water to back flow into the coupling of the valve. As sewage and drain water then rises within the valve, a float means is displaced. This displacement triggers the release or unlocking of the valve lid. As the sewage and drain water rises yet further, the lid is opened to unblock the aperture of the valve. Thus, the sewage and drain water exits the system at the relief valve instead of backing up into the sewage generating facility.

It should be understood, of course, that the foregoing relates only to the preferred embodiments of the present invention and that numerous modifications or alterations may be made therein without departing from the spirit and scope of the invention as set forth in the appended claims.

We claim:

1. A sewer relief valve comprising:

a coupling member adapted to connect to a sewer line and including an upper end defining a material flow opening;

a lid [selectably] connectable to said coupling member to obstruct said material flow opening of said coupling member;

means within said coupling member for locking said lid in obstruction of said material flow opening of said coupling member;

float means comprising a buoyant member pivotally disposed within said coupling; and means for venting a build-up of air pressure within said coupling member through said upper end while said lid is locked in obstruction of said material flow opening of said coupling member, so that compressed air is vented from within said coupling member to allow a back flow of sewage to rise within said coupling member and displace said float means, whereby displacement of said float means in response to a back flow of sewage within said coupling member positively unlocks said lid and permits said lid to be opened so as to unblock said material flow opening, thus permitting said back flow of sewage to escape through said material flow opening [, and upon interruption of said back flow of sewage, said lid is permitted to automatically relock to obstruct the material flow opening].

2. The sewer relief valve of claim 1 wherein said means for locking said lid in obstruction of said material flow opening comprises a pivot arm operatively connected to said float means, and means for retaining said pivot arm in selective locking engagement between said lid and said coupling member so as to maintain said lid in a locked position until a back flow of sewage within said coupling member displaces said float means so as to positively unlock said lid.

3. The sewer relief valve of claim 1 wherein said float means is pivotally mounted upon a pivot arm, and said pivot arm is suspended within said coupling member by a pivot pin depending from at least one carrier member, said pivot pin being inserted through an aperture defined in said pivot arm.

4. The sewer relief valve of claim 1 wherein said lid further comprises an access opening providing access to the interior of said coupling member for mechanical displacement of said float means, thereby permitting unlocking of said lid from outside said coupling member, and a selectably removable plug configured for receipt by said access opening so as to provide an airtight and fluid-tight seal of said material flow opening when said lid is in a closed position.

5. The sewer relief valve of claim 1 wherein said lid is disposed for pivotal movement.

6. The sewer relief valve of claim 2 wherein said means for venting a build-up of air pressure within said coupling member comprises a gap of predetermined dimension between a first end of said pivot arm and said retaining means, whereby said compressed air displaces said lid with respect to said material flow opening only to an extent permitted by said gap, thereby venting said compressed air while said lid is maintained in said locked position.

7. The sewer relief valve of claim 6 wherein said means for locking said lid in obstruction of said material flow opening of said coupling member comprises a latch extension attached to a first end of said pivot arm and a lock member depending from an interior surface of said coupling member in position to engage said latch extension when said float means is not displaced, said gap being defined between said latch extension and said lock member so as to permit displacement of said lid while said lid remains locked.

8. The sewer relief valve of claim 6 wherein said means for locking said lid in obstruction of said material flow opening of said coupling member comprises latch extension attached to a first end of said pivot arm and a lock member depending from the underside of said lid in position to engage said latch extension when said float means is not displaced, said gap being defined between said latch extension and said lock member so as to permit displacement of said lid while said lid is locked.

9. The sewer relief valve of claim 6 wherein said float means is removably connected to a second end of said pivot arm.

10. The sewer relief valve of claim 11 further comprising a sealing member operatively associated with said coupling member and a confronting portion of said lid to provide an airtight and fluid-tight seal of said material flow opening of said coupling member when said lid is in a closed position.

11. The sewer relief valve of claim 1 wherein said venting means comprises an air-pressure relief valve operatively secured within said lid for venting compressed air from within said coupling member while said lid is maintained in a locked position.

12. A sewer relief valve comprising:

a coupling member adapted to connect to a sewer line, said coupling member including an upper end defining a material flow opening;

a lid [selectably] connectable to said coupling member to obstruct said material flow opening of said coupling member;

means within said coupling member for locking said lid in obstruction of said material flow opening of said coupling member;

float means comprising a buoyant member slidably disposed within said coupling member; and means for venting a build-up of air pressure within said coupling member through said upper end while said lid is locked in obstruction of said material flow opening of said coupling member, so that compressed air is vented from within said coupling member to allow a back flow of sewage to rise within said coupling member and displace said float means, whereby displacement of said float means in response to said backflow of sewage within said coupling member positively unlocks said lid and permits said lid to be opened so as to unblock said material flow opening, thus permitting said backflow of sewage to escape through said material flow opening [, and upon interruption of said backflow of sewage, said lid is permitted to automatically relock to obstruct the material flow opening].

13. The sewer relief valve of claim 12 wherein said means for locking said lid in obstruction of said material flow opening of said coupling member comprises at least one pivot arm pivotably suspended within said coupling member, and means for retaining said pivot arm in selective locking engagement between said lid and said coupling member so as to maintain said lid in a locked position until a back flow of sewage within said coupling member displaces said float means so as to positively unlock said lid.

14. The sewer relief valve of claim 13 wherein said means for venting a build-up of air pressure within said coupling member comprises a gap of predetermined dimension between a first end of said pivot arm and said retaining means, whereby said compressed air displaces said lid with respect to said material flow opening only to an extent permitted by said gap, thereby venting said compressed air while said lid is maintained in said locked position.

15. The sewer relief valve of claim 13 wherein said means for retaining said pivot arm comprises a locking loop depending from the underside of said lid.

16. The sewer relief valve of claim 13 further comprising a release member suspended within said coupling member so as to engage at least one pivot arm to thereby unlock said lid as said float means is displaced in response to said back flow of sewage within said coupling member.

17. The sewer relief valve of claim 12 wherein said means for venting a build-up of air pressure within said coupling member comprises a relief valve operatively secured within said lid for venting compressed air from within said coupling member while said lid is maintained in a locked position.

18. The sewer relief valve of claim 12 wherein said lid further comprises an access opening providing access to the interior of said coupling member for mechanical displacement of said float means, thereby permitting unlocking of said lid from outside said coupling member, and a selectably removable plug configured for receipt by said access opening so as to provide an airtight and fluid-tight seal of said material flow opening when said lid is in a closed position.

19. The sewer relief valve of claim 12 further comprising a sealing member operatively associated with said coupling member and a confronting portion of said lid to provide an airtight and fluid-tight seal of said material flow opening of said coupling member when said lid is in a closed position.

20. The sewer relief valve of claim 12 wherein said float means further comprises a release member configured to engage said locking means and operatively associated with said float means, whereby said float means positively unlocks said locking means in response to displacement of said float means by said back flow of sewage in said coupling member.

21. The sewer relief valve of claim 12 wherein said float means is suspended within said coupling member by a rod member, said rod member being threadably operable within said lid, whereby rotation of said rod member relative to said lid displaces said float means so as to unlock said lid.

22. A sewer relief valve comprising:

a coupling member connectable to a sewer line, said coupling member including an upper end defining a material flow opening;

a lid selectably connectable to said coupling member to obstruct said material flow opening of said coupling member;

means within said coupling member for locking said lid in obstruction of said material flow opening of said coupling member, said locking means comprising at least one substantially horizontal lock rod suspended within said coupling member, and means for retaining said lock rod so as to maintain said lid in a locked position;

float means comprising a buoyant member disposed for vertical movement within said coupling member; and means for venting a build-up of air pressure within said coupling member through said upper end while said lid is locked in obstruction of said material flow opening of said coupling member, so that compressed air is vented from within said coupling member to allow a back flow of sewage to rise within said coupling member and displace said float means, whereby displacement of said float means in response to said back flow of sewage within said coupling member positively unlocks said lid and unblocks said material flow opening, thus permitting said backflow of sewage to escape through said material flow opening [, and upon interruption of said backflow of sewage, said lid is permitted to automatically relock to obstruct the material flow opening].

23. The sewer relief valve of claim 22 wherein said float means is operatively suspended within said coupling member by an interconnecting member, and said interconnecting member is operatively secured to a hinge means, said hinge means being configured for receipt of said lock rod so that vertical displacement of said float means in response to a back flow of sewage cooperates with said hinge means to positively withdraw said lock rod from said retaining means to unlock said lid and permit said lid to be opened so as to unblock said material flow opening.

24. The sewer relief valve of claim 23 wherein said retaining means comprises an indentation in an interior wall of said coupling member.

25. The sewer relief valve of claim 22 wherein said lid further comprises an access opening providing access to the interior of said coupling member for mechanical displacement of said float means, thereby permitting unlocking of said lid from outside said coupling member, and a selectably removable plug for receipt by said access opening so as to provide an airtight and fluid-tight seal of said material flow opening when said lid is in a closed position.

26. The sewer relief valve of claim 22 wherein said means for venting a buildup of air pressure within said coupling member comprises a gap of predetermined dimension between an outer portion of said lock rod and said retaining means, whereby said compressed air displaces said lid with respect to said material flow opening only to an extent permitted by said gap, thereby venting said compressed air while said lid is maintained in said locked position.

27. The sewer relief valve of claim 22 further comprising a sealing member operatively associated with a portion of said coupling member and a confronting portion of said lid to provide an airtight and fluid-tight seal of said material flow opening of said coupling member when said lid is in a closed position.

28. The sewer relief valve of claim 22 wherein said venting means comprises an air-pressure relief valve operatively secured within said lid for venting compressed air from within said coupling member while said lid is maintained in a locked position.

* * * * *